(12) United States Patent
Nassar

(10) Patent No.: US 6,801,528 B2
(45) Date of Patent: Oct. 5, 2004

(54) SYSTEM AND METHOD FOR DYNAMIC SIMULTANEOUS CONNECTION TO MULTIPLE SERVICE PROVIDERS

(75) Inventor: Ayman Nassar, Clarksville, MD (US)

(73) Assignee: Ericsson Inc., Plano, TX (US)

( * ) Notice: Subject to any disclaimer, the term of this patent is extended or adjusted under 35 U.S.C. 154(b) by 272 days.

(21) Appl. No.: 10/189,324

(22) Filed: Jul. 3, 2002

(65) Prior Publication Data

US 2004/0004968 A1 Jan. 8, 2004

(51) Int. Cl.[7] .................. H04L 12/28; H04L 12/56
(52) U.S. Cl. .................. 370/389; 370/401; 709/225; 709/229; 709/238; 709/228; 709/244; 709/245
(58) Field of Search .................. 709/225, 227, 709/228, 229, 238, 239, 219, 245, 244; 707/10; 370/389, 401, 352

(56) References Cited

U.S. PATENT DOCUMENTS

| | | | |
|---|---|---|---|
| 5,790,548 A | 8/1998 | Sistanizadeh et al. | 370/401 |
| 5,862,490 A | 1/1999 | Sasuta et al. | 455/525 |
| 6,058,431 A | 5/2000 | Srisuresh et al. | 709/245 |
| 6,097,719 A | 8/2000 | Benash et al. | 370/352 |
| 6,101,182 A | 8/2000 | Sistanizadeh et al. | 370/352 |
| 6,119,152 A | 9/2000 | Carlin et al. | 709/217 |
| 6,154,839 A | 11/2000 | Arrow et al. | 713/154 |
| 6,243,754 B1 * | 6/2001 | Guerin et al. | 709/227 |
| 6,249,523 B1 | 6/2001 | Hrastar et al. | 370/401 |
| 6,266,707 B1 | 7/2001 | Boden et al. | 709/245 |
| 6,332,157 B1 | 12/2001 | Mighdoll et al. | 709/217 |
| 6,598,080 B1 * | 7/2003 | Nagami et al. | 709/227 |
| 2001/0028660 A1 * | 10/2001 | Carolan et al. | 370/466 |
| 2002/0023174 A1 * | 2/2002 | Garrett et al. | 709/245 |
| 2002/0036658 A1 * | 3/2002 | Carolan et al. | 345/764 |
| 2003/0172170 A1 * | 9/2003 | Johnson et al. | 709/230 |
| 2003/0214959 A1 * | 11/2003 | Wang | 370/401 |

FOREIGN PATENT DOCUMENTS

JP   10 084 382   3/1998

* cited by examiner

Primary Examiner—Wellington Chin
Assistant Examiner—Chuong Ho

(57) ABSTRACT

A policy enables a subscriber to connect to multiple service providers simultaneously using a network address translation technique that translates an address identifying the subscriber and associated with a first service provider into an address identifying the subscriber and associated with a second service provider for a particular application. The subscriber registers with a single home service provider and connects to that single home service provider for a packet session. To connect to additional service providers that provide additional applications during the packet session, the NAT rule is downloaded from the home service provider to a router at the border between the subscriber and the access network of the home service provider. Each IP packet received at the router to or from the subscriber is filtered to determine the subscriber's address and an application identifier. Based on the combination of both the subscriber's address and the application identifier, the router translates the subscriber's address into a new address, using the NAT rule. The new address is used to connect the subscriber to an additional service provider for a particular application during the packet session with the home service provider.

65 Claims, 7 Drawing Sheets

SYSTEM AND METHOD FOR DYNAMIC SIMULTANEOUS CONNECTION TO MULTIPLE SERVICE PROVIDERS

BACKGROUND OF THE INVENTION

1. Field of the Invention

The present invention relates generally to packet networks, and specifically to packet networks employing network address translation for routing of packet.

2. Description of Related Art

In recent years, the need for remote computing has dramatically increased, thereby further increasing utilization of the Internet as one of the primary communication media for many individuals and businesses. Since the early days of the Internet, subscribers have normally connected to the Internet through a single service provider that provides access to the Internet or other type of packet network In a typical scenario, a subscriber initiates a packet session by causing a machine (e g., a personal computer, laptop computer, personal digital assistant, wireless phone or any other computing device capable of connecting to the Internet) to dial a number associated with a particular service provider to setup a packet call connection between the machine and a point of presence (access point) of that particular service provider. After the connection between the machine and the point of presence of the service provider is established, the subscriber is authenticated before being granted access to the Internet. During the entire packet session, the subscriber uses the same service provider for all of the applications accessed by the subscriber.

However, the types of applications provided by the different service providers may vary widely from one service provider to another. As subscribers become more sophisticated and begin demanding a variety and multitude of applications, subscribers may be forced to register with more than one service provider to meet all of the subscribers needs, which is both unpractical and costly for the subscriber. In the alternative, in order to keep customers, service providers may also be forced to upgrade their systems to offer additional applications, which may also be unpractical and costly for the service provider.

For example, a physician in a clinic may need basic Internet access to "surf the web" for general information, such as traffic reports, hospital addresses, weather information and many other basic common information. That same physician, however, may also need a secure link to a clearing house web site to clear medical claims that contain confidential patient information. Hence, in addition to a basic Internet application, the service provider may also need to provide a secure application that includes encryption technology and/or other secure treatment of the confidential patient information. Furthermore, the physician may also need to send high resolution medical images for x-rays, or may need to participate in online tele-medicine events, such as surgery. Thus, to meet all of the physicians needs, the service provider may need to provide not only a basic Internet application and a secure application, but also a low latency, low jitter, real-time application capable of handling high resolution images.

Most likely, today's service providers would not be able to provide all of these applications to the physician. Therefore, the physician would have to register with and separately connect to three different service providers, one for basic web and email applications, another for VPN (virtual private network) or encryption applications and a third for real time communication applications. Each service provider may separately charge the physician at different intervals, resulting in three separate bills. In addition, to connect to all three service providers simultaneously, the physician may further require three machines and three communication access lines (e.g, telephone lines, DSL, cable, etc.), adding to the physician's expense.

SUMMARY OF THE INVENTION

To overcome the deficiencies of the prior art, embodiments of the present invention provide a network address translation (NAT) rule that translates an address identifying a subscriber and associated with a first service provider into an address identifying the subscriber and associated with a second service provider for a particular application. The subscriber registers with a single home service provider and connects to that single home service provider for a packet session. A subscriber profile that includes the NAT rule is downloaded from the home service provider to a router and stored in a policy table therein. In one embodiment, the router is located at the border between the local network of the subscriber and an access network of the home service provider.

In one implementation embodiment, the header of each IP (Internet Protocol) packet received at the router to or from the subscriber is read to determine the subscriber's address and an application identifier. Based on the combination of both the subscriber's address and the application identifier, the router translates the subscriber's address into a new address, using the NAT rule. For example, for outgoing IP packets, the translated IP address of the subscriber can be an address associated with a different service provider that has been contracted to support the particular application associated with the application identifier. In another implementation embodiment, the router uses the combination of the subscriber's address and an address associated with the other service provider to translate the subscriber's address into a new address, using the NAT rule. The new address is used to connect the subscriber to an additional service provider for a particular application during the packet session with the home service provider.

In one configuration embodiment, the NAT rule can be downloaded to the router upon log-in and authentication of the subscriber. In other configuration embodiments, the NAT rule can be downloaded to the router during the packet session. For example, the subscriber can be provided a web portal during the packet session that allows the subscriber to select specific applications provided by other service providers that the subscriber would like to access during the packet session. In still further configuration embodiments, the NAT rule can be a static, pre-configured rule maintained by the router

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that these embodiments provide only a few examples of the many advantageous uses of the innovative teachings herein In general, statements made in the specification of the present application do not necessarily delimit any of the various claimed inventions. Moreover, some statements may apply to some inventive features, but not to others.

Figure 1:
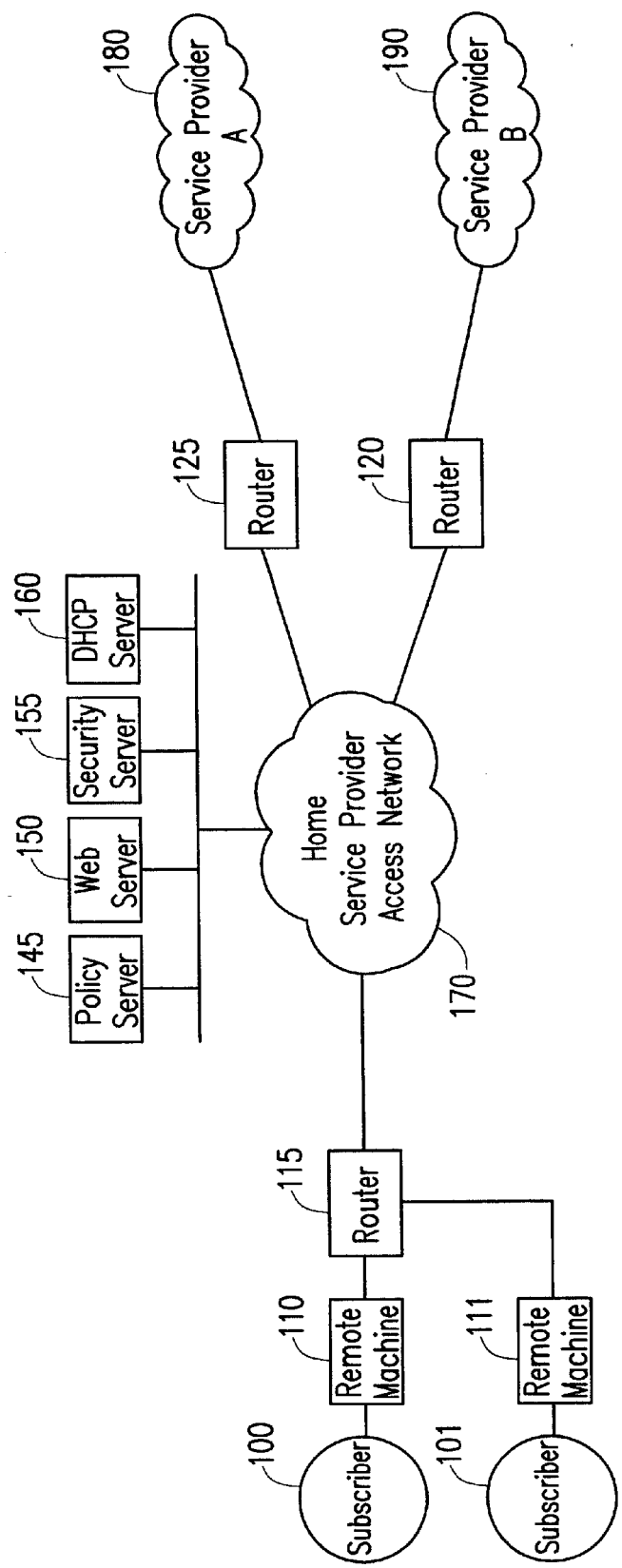
FIG. 1 is a network diagram illustrating the interconnection between two or more service providers and a subscriber during a packet session.

FIG. 1 is a network overview of exemplary embodiments of the system of the present invention. Subscribers 100 and 101 are regular subscribers of a home service provider. The home service provider provides access to the Internet or other type of packet network through home service provider access network 170 (e.g., point of presence or access point of the home service provider) Subscribers 100 and 101 connect to home service provider access network 170 for respective packet sessions via remote machines 110 and 111. It should be understood that remote machines 110 and 111 can be a personal computer, laptop computer, personal digital assistant, wireless phone or any other computing device capable of connecting to the packet network.

Packet sessions will be described herein as Internet Protocol (IP) sessions for ease of discussion However, it should be readily apparent to one skilled in the art that embodiments of the present invention can also be applied to other types of packet sessions, such as Multi-Protocol Label Switching (MPLS) or Asynchronous Transfer Mode (ATM) packet sessions. For example, to initiate an IP packet session, remote machine 110 can request IP address configuration information (e.g., the remote machine 110 sends a request for an IP address for the packet session) using a protocol such as Dynamic Host Configuration Protocol (DHCP). For details about DHCP, reference is made to the Internet Engineering Task Force (IETF) RFC 2131, which is hereby incorporated in it's entirety herein However, it should be readily apparent to one skilled in the art that embodiments of the present invention can be practiced using other protocols as well, such as point-to-point protocol (PPP), as is described in RFC 1661, which is hereby incorporated in it's entirety herein.

Router 115, acting as a DHCP relay agent, forwards the DHCP request from remote machine 110 to DHCP server 160 of the home service provider. As is understood in the art, IP routers are devices that forward IP packets (also known as IP datagrams) based on information in the IP header of an IP packet. In addition, IP routers enable constituent networks to be connected together to form a larger global Internet. Routers typically have at least one physical interface that enables connection to two or more logical interfaces, represented by IP subnets or unnumbered point to point lines. Forwarding an IP packet generally requires the router to choose the address and relevant interface of the next-hop router or the destination host. This choice, called relaying or forwarding, depends upon a routing table (typically stored in a database) within the router. The routing table is maintained dynamically to reflect the current topology of the Internet system.

DHCP server 160 assigns an IP address to the remote machine 110 and passes the assigned IP address back to the remote machine 110 via router 115. Other IP configuration parameters can also be sent to the remote machine 110 at this time The assigned IP address and other IP configuration parameters allow the remote machine 110 to have limited access to the home service provider's access network 170. For example, such limited access could be in the form of a web page on web server 150 that solicits authentication information (e.g., user name, password and group name, if any) from the subscriber 100. Web server 150 can forward the user name, password and group name to security server 155 to authenticate and authorize the subscriber 100 to network 170, using a protocol such as Lightweight Directory Assistance Protocol (LDAP), as defined in the IETF's specifications RFC 2849, which is hereby incorporated in its entirety herein, or any other protocol. In addition, once authenticated, security server 155 can send a message identifying the subscriber 100 and requesting a subscriber profile to policy server 145, using LDAP.

Policy server 145 downloads a subscriber profile containing various policies and configuration information associated with the subscriber 100 to router 115, using protocols such as COPS, SNMP, or simply emulating a user command line interface command on router 115. In one embodiment, router 115 can be located in the access network 170 of the home service provider at the border between the local network of remote machine 110 and the access network 170. However, it should be understood that a different router or multiple routers can receive the downloaded subscriber profile. The subscriber profile can be specific to multiple users of the group to which subscriber 100 is part of or specific to only the subscriber 100 and not to any group to which the subscriber belongs.

Various downloaded policies in the subscriber profile may include, for example, encryption policies and compression policies. In addition, in accordance with embodiments of the present invention, among the policy parameters and configuration information downloaded in the subscriber profile are one or more network address translation (NAT) rules, where each NAT rule applies to all IP packets sourced to and from remote machine 110 while remote machine 110 is running a specific application. An application includes any service that a subscriber requires during a packet session. By way of example, but not limitation, an application can be a basic web and email application, an encryption application or a real-time communication application. Using the NAT rules, a subscriber 100 can connect to one or more additional service providers (e.g., service provider A 180 and/or service provider B 190) via additional routers 120 and 125 during the packet session with home service provider 170 to execute additional applications provided by additional service providers 180 and 190.

It should be noted that subscriber 101, connected to a different remote machine 111, has a different user name and either the same or different group membership as subscriber 100. Therefore, subscriber 101 is assigned a different IP address by DHCP server 160. Hence, as a result, the subscriber profile associated with subscriber 101 that is downloaded to the router 115 has a different set of policies to be applied to IP packets originating from and terminating at remote machine 111. It should further be noted that both remote machines 110 and 111 could be connected to the same router 115 or to different routers and that both remote machines 110 and 111 could be connected to the same router port or different ports.

The NAT rules described herein should be distinguished from traditional NAT. One part of traditional NAT includes a method by which IP addresses are mapped from one group to another, transparent to end users, as is described in RFC 1918, which is hereby incorporated by reference in it's entirety herein. Another part of traditional NAT is Network Address Port Translation (NAPT), which is a method by which many network addresses and their TCP/UDP (Transmission Control Protocol/User Packetgram Protocol) ports are translated into a single network address and its TCP/UDP ports. Together, these two traditional NAT operations provide a mechanism to connect a realm with private addresses to an external realm with globally unique registered addresses. Although the NAT rules described herein do enable the translation of IP addresses transparent to end users, the NAT rules of the present invention are not for the purpose of connecting private addresses with globally unique registered addresses. Instead, the NAT rules described herein serve to translate one IP address (global or private) owned by a first service provider to another IP address (global or private) owned by a second service provider, but associated with the first service provider, based on the application being run to enable simultaneous connection to multiple service providers.

Figure 2:
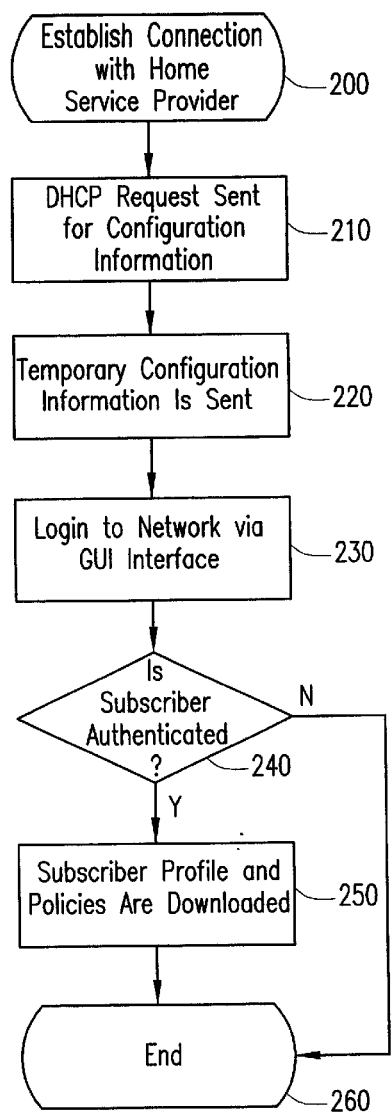
FIG. 2 is a flowchart illustrating exemplary steps for enabling the interconnection between two or more service providers and a subscriber during a packet session.

Turning now to FIG. 2, exemplary steps for downloading the subscriber profile containing the NAT rule(s) are shown. Once a subscriber has established a connection between the home service provider and a remote machine through the router (step 200), the remote machine sends a DHCP request for IP configuration information to the DHCP server of the home service provider access network (step 210). Alternatively, the remote machine can be assigned a static IP address and use this assigned IP address during log-in and authentication.

After the temporary configuration information is received at the remote machine (e.g, an IP address) (step 220), the subscriber logs-in to the home service provider access network via a graphical user interface at the remote machine to initiate a packet session (step 230) For example, the subscriber can enter a user name, password and a group name, if any, into the remote machine for transmission to the access network of the home service provider for authentication of the subscriber. If the subscriber is not authenticated to the network (e.g., the user name, password and/or group name is not registered with the home service provider) (step 240), the process ends (step 260). However, if the subscriber is authenticated (step 240), the subscriber profile containing NAT rules and other policies is downloaded to the router at the border between the local network of the remote machine and the access network of the home service provider (step 250). These NAT rules are used by the router to connect the remote machine to additional service providers during the packet session with the home service provider to execute one or more additional applications provided by the additional service providers (step 260).

Figure 3:
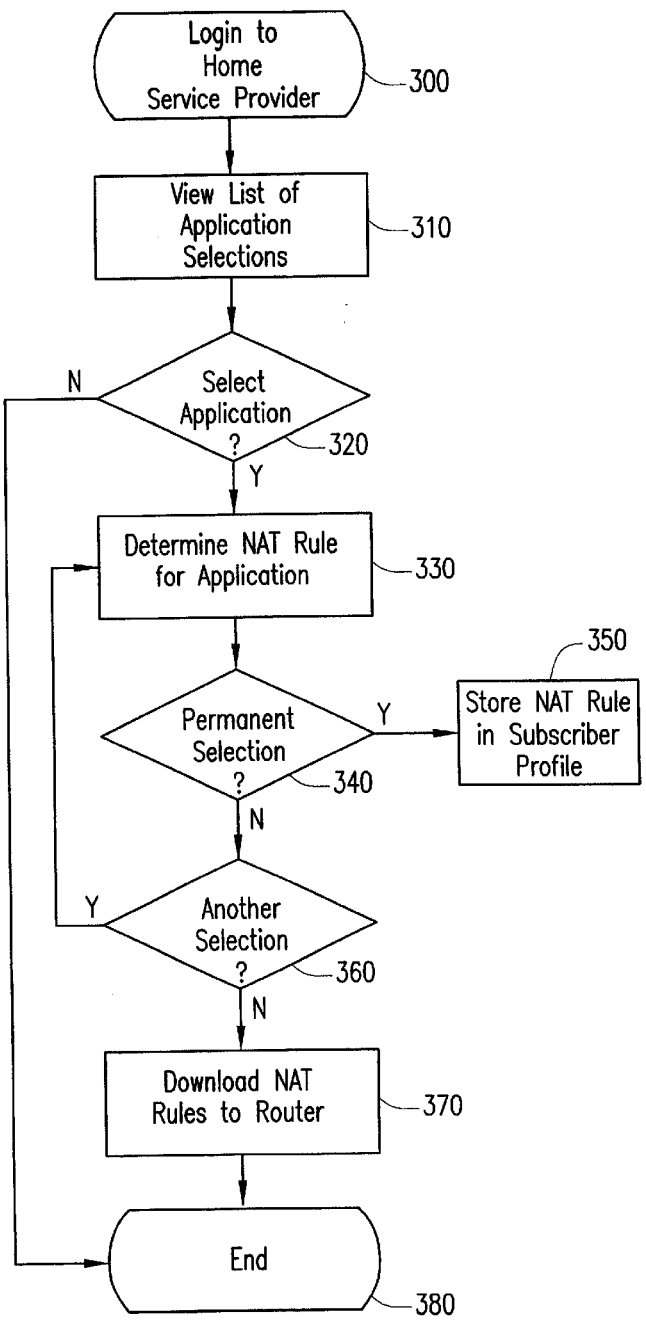
FIG. 3 is a flowchart illustrating exemplary steps for selecting the service providers to connect to during a packet session.

To determine the particular application(s) that the subscriber may require during a packet session, the subscriber can select one or more applications from a list of available applications at the home service provider. The selected application identities can be downloaded in NAT rules with the subscriber profile for every packet session or downloaded in NAT rules for only a current packet session For example, as shown in FIG. 3, upon logging into the home service provider access network (step 300), the subscriber can be presented with a web page that allows the subscriber to view a list of applications provided by other service providers (step 310) that the home service provider has contracts with (e.g., service providers 180 and 190 of FIG. 1). There can be more than one service provider per application in the list or only one service provider per application in the list, depending upon the contracts negotiated between service providers.

From this list, the subscriber can select one or more applications (and associated service providers) that the subscriber may want to access during a packet session (step 320). For each application selected, the NAT rule for that application is determined (step 330), and if the selection is a permanent selection to be used for all packet sessions (step 340), the NAT rule can be stored in the subscriber profile within the policy server of the home service provider (step 350) to be downloaded each time the subscriber logs into the home service provider access network. After the subscriber has completed his or her selections (step 360), the NAT rules for all of the selected applications are downloaded to the router (step 370) for use during the current packet session in routing IP packets to the appropriate service providers (step 380).

In other embodiments, the NAT rule can be a static, pre-configured rule that is permanently stored in the router. For example, the subscriber may be a fixed subscriber, whose user name and password are always associated with the same interface and port at the router. In this case, the router can maintain the NAT rule permanently, without requiring the NAT rule to be downloaded during each packet session.

Figure 4:
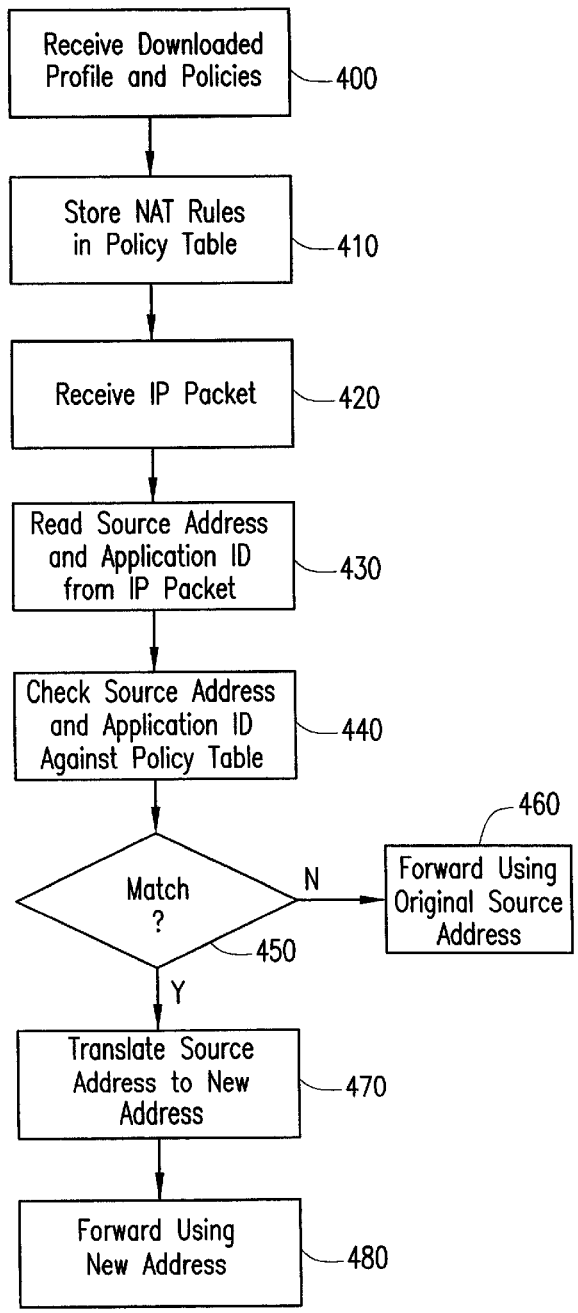
FIG. 4 is a flowchart illustrating exemplary steps for routing IP packets from a subscriber to connect to more than one service provider during a packet session.

FIG. 4 illustrates how the NAT rules and other policies downloaded to the router are applied to IP packets originating from the remote machine. Upon receiving the downloaded subscriber profile (step 400), the router stores the NAT rules in policy tables (similar to traditional routing tables) within the router (step 410) for use in routing IP packets to the appropriate service provider for a particular application. To access a particular application provided by another service provider, an IP packet, including the application identifier of the particular application, is passed from the remote machine to the router (step 420) Upon receiving the IP packet, the router inspects certain fields in the IP packet.

Figure 5:
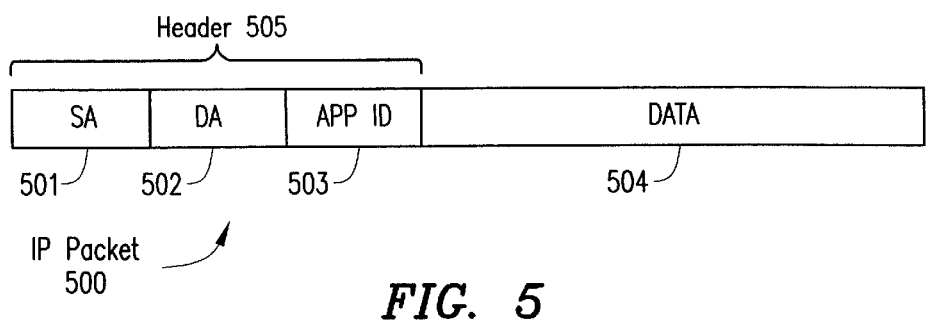
FIG. 5 shows an IP packet that can be routed in accordance with embodiments of the present invention.

FIG. 5 illustrates the fields in the IP packet 500 that would be inspected by the router upon receiving the IP packet 500 from the remote machine. The IP packet 500 has two main parts, header 505, which carries control information about the packet, and data 504, which is the voice or data being transported in the packet. Header 505 has a fixed format and length, while data 504 may have a varying length. The fields of header 505 relevant to this invention are the IP source address (SA) field 501 that includes the IP address of the source of the packet, IP destination address (DA) field 502 that includes the IP address of the destination of the packet, and application identifier (APP ID) field 503 that includes the identity of the particular application associated with the packet. Sources and destinations of IP packets 500 are generally referred to as Internet hosts An Internet host is an entity in a network that has an IP address and does not forward packets that are not addressed to itself Thus, Internet hosts are considered to be end points of packet communications.

Turning again to FIG. 4, the router reads the IP address in the source header field and application identifier in the application header field from the IP packet header (step 430) and checks the source address and application identifier against the NAT rules downloaded from the policy server and stored in a source policy table (step 440). If the source address and application identifier do not match one of the NAT rules stored in the source policy table (step 450), the IP packet is forwarded without modifying the source address (step 460). However, if the source address and application identifier matches one of the NAT rules stored in the source policy table (step 450), the router translates the source address to a new source IP address (step 470) and forwards the IP packet using the new source IP address to the service provider associated with the new source IP address (step 480).

The new source IP address is a part of the pool of IP addresses assigned to the service provider that has been contracted to support the application associated with the application identifier. For example, from the pool of IP addresses assigned to a first service provider, a portion of that pool can be designated from the first service provider to a second service provider for use by subscribers of the second service provider in accessing the application provided by the first service provider.

Figure 6:
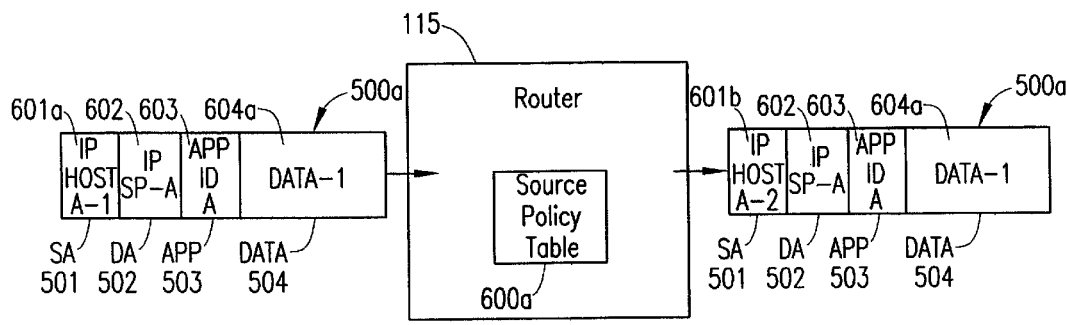
FIG. 6 is a diagram illustrating the translation of an IP packet from a subscriber to connect to more than one service provider during a packet session.

FIG. 6 illustrates the translation of an IP address (IP Host A-1) 601a within the SA field 501 in sent IP packet 500a by router 115 to a new IP address (IP Host A-2) 601b, according to the NAT rules downloaded to router 115 and stored in a source policy table 600a. The sent IP packet 500a includes an IP address (IP Host A-1) 601a for the source (originating remote machine) of the IP packet 500a, an IP address (IP SP-A) 602 for the destination (service provider) of the IP packet 500a, application identifier (APP ID-A) 603 and data (DATA-1) 604a. Source policy table 600a stores the various policies to be applied to IP packets 500a originating from IP address 601a and requesting APP ID-A 603 defined in APP ID field 503 The policy is to translate remote machine IP address 601a to a new remote machine address 601b in SA field 501 and define the forwarding rule by a next hop router (such as router 125 shown in FIG. 1). In one embodiment of the invention, other additional policies could be applied to the IP packets 500a based upon the values in other header fields 501–503 For example, the additional policies could apply rules to perform encryption, service flows, compression, or any other network layer service.

Figures 7A, 7B:
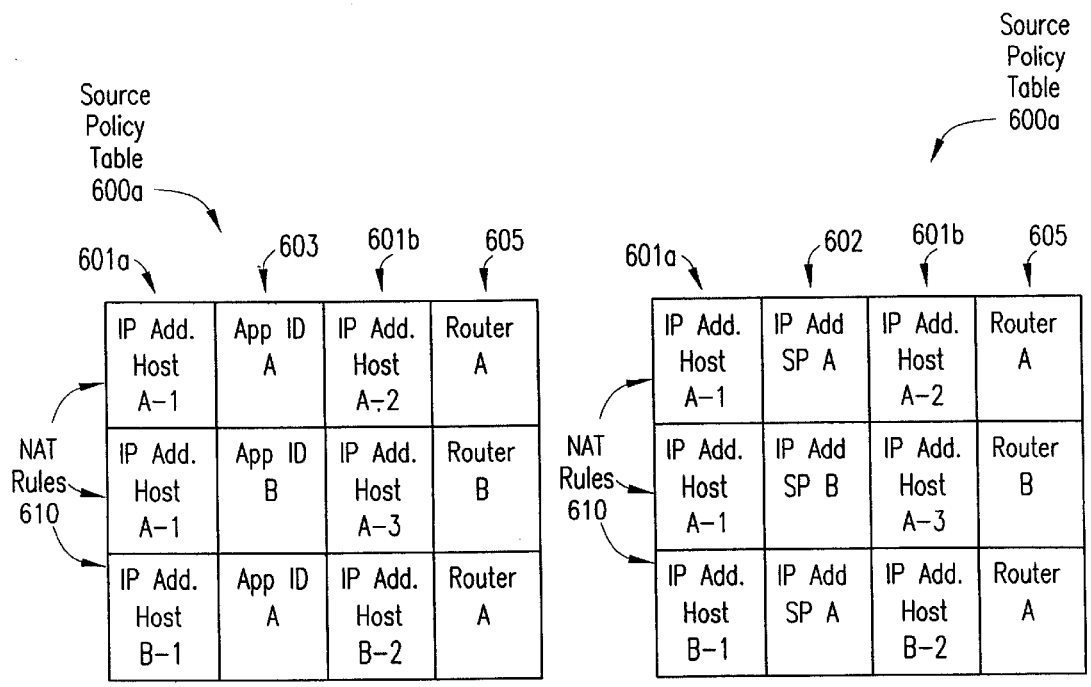
FIGS. 7A and 7B are exemplary policy tables for translating the source address of an IP packet in accordance with embodiments of the present invention.

FIGS. 7A and 7B are exemplary source policy tables 600a for translating the remote machine IP address 601a of a sent IP packet 500a (shown in FIG. 6), in accordance with embodiments of the present invention. Each source policy table 600a includes one or more NAT rules 610 downloaded to the router. In FIG. 7A, each NAT rule 610 identifies a particular remote machine IP address 601a for the source of IP packets and application identifier 603 associated with the NAT rule 610. The router compares the remote machine IP address 601a within the SA field and application identifier 603 within the APP ID field in an IP packet to each NAT rule 610 stored within the source policy table 600a to determine whether a particular NAT rule 610 should be applied to the IP packet. Both the remote machine IP address 601a and application identifier 603 can be used to compare with each NAT rule 610, or only the remote machine IP address 601a can be compared first, and from the matching NAT rules 610 with that IP address 601a, the application identifier 603 can be compared to determine the appropriate NAT rule 610, if any, from the NAT rules 610 associated with the subscriber.

For example, as shown in FIG. 7A, two the NAT rules 610 within the source policy table 600a have a field indicating that the remote machine IP address 601a is the IP Address for "Host A" and one of the NAT rules 601 has a field indicating that the remote machine IP address 601a is the IP Address for "Host B". Therefore, if the remote machine IP address 601a within the IP packet is the IP Address for "Host A", the router can compare the application identifier 603 within the IP packet with the two NAT rules 610 within the source policy table 600a associated with "Host A" to determine if there is a matching NAT rule 610. As an example, if the application identifier 603 within the IP packet matches one of the application identifiers 603 within one of the NAT rules 610 associated with "Host A" (e.g., application identifier "A"), the NAT rule 610 associated with "Host A" for that application identifier 603 will be used to apply the policy defined by the matching NAT rule 610 on the IP packet.

If both the remote machine IP address 601a within the SA field and application identifier 603 within the APP ID field of an IP packet match one of the NAT rules 610 within the policy table 600a, the policy that the matching NAT rule 610 applies is to translate the remote machine IP address 601a in the SA field of the IP packet into a new remote machine IP address 601b assigned to the additional service provider that is providing the application identified by the application identifier 603. The policy that the matching NAT rule 610 applies also further defines the forwarding of the IP packet by indicating next hop information 605 identifying the next router or Internet host (i.e., server hosted by the other service provider) to receive the IP packet.

In FIG. 7B, instead of using the application identifier 603 as an indicator of the particular NAT rule 610 to apply, the source policy table 600a can store the IP address 602 associated with the particular service provider that is providing the application. If both the service provider IP address 602 and remote machine IP address 601a match one of the NAT rules 610 within the source policy table 600a, that matching NAT rule 610 is used to translate the remote machine IP address 601a into a new remote machine IP address 601b assigned to the additional service provider that is identified by the service provider IP address 602 in the DA field. The service provider IP address 602 may be beneficial in the situation where the subscriber has selected more than one service provider to provide the same application to enable proper routing of the IP packet. For example, the subscriber may require two separate e-mail accounts, one for business and one for personal use, and may use two separate service providers for each e-mail account. To enable the subscriber to access both e-mail accounts simultaneously, the destination address of the IP packet (e.g., the IP address of the service provider) can be used to properly route IP packets towards each of the two e-mail service providers.

Figure 8:
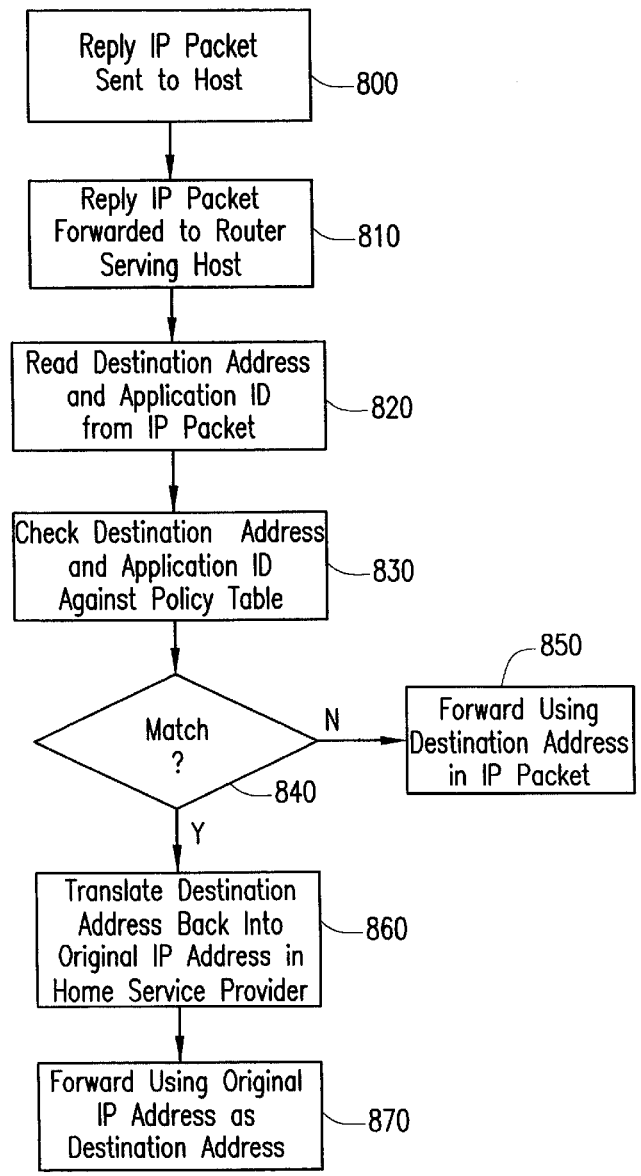
FIG. 8 is a flowchart illustrating exemplary steps for routing reply IP packets to a subscriber connected to more than one service provider during a packet session.

FIG. 8 illustrates the process of forwarding reply IP packets to the remote machine (i.e., Internet host) from the server hosted by another service provider during a packet session with the home service provider. When the reply IP packet is sent towards the remote machine (step 800), the router at the edge of the access network of the additional service provider recognizes the IP address as being part of a pool of addresses belonging to the additional service provider, but assigned to the home service provider and forwards the reply IP packet to the router at the edge of the access network of the home service provider through the use of IP routing protocols (step 810). Upon receiving the reply IP packet, the router in the access network of the home service provider inspects the reply IP packet fields to read the IP address within the destination header field and the application identifier within the application header field of the reply IP packet (step 820).

Thereafter, the router checks the destination address and application identifier against a destination policy table within the router (step 830) to determine if any of the NAT rules within the destination policy table matches the destination address and application identifier of the reply IP packet (step 840). If the destination address and application identifier do not match one of the NAT rules stored in the source policy table (step 840), the IP packet is forwarded without modifying the destination address (step 850). However, if one of the NAT rules does match the destination address and application identifier of the reply IP packet (step 840), the router translates the destination address to the IP address of the remote machine (Internet host) in the home service provider (step 860) and forwards the reply IP packet to the remote machine using the new destination IP address (step 870). It should be readily apparent that the source IP address for IP packets sent from the remote machine to the router in the access network of the home service provider is the same as the destination IP address for IP packets sent to the remote machine from the router in the access network of the home service provider.

Figure 9:
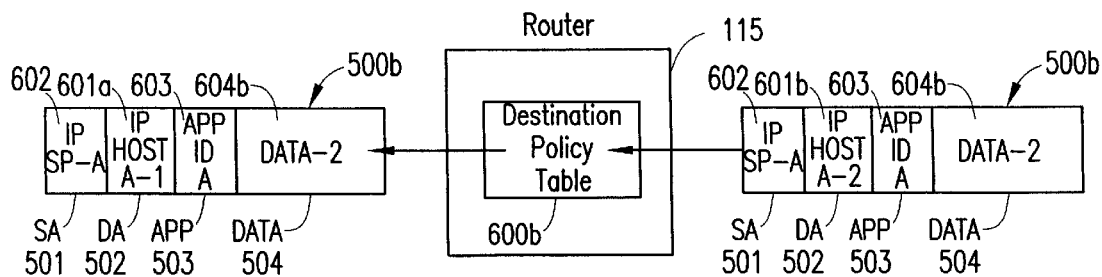
FIG. 9 is a diagram illustrating the translation of a reply IP packet to a subscriber connected to more than one service provider during a packet session.
Figures 10A, 10B:
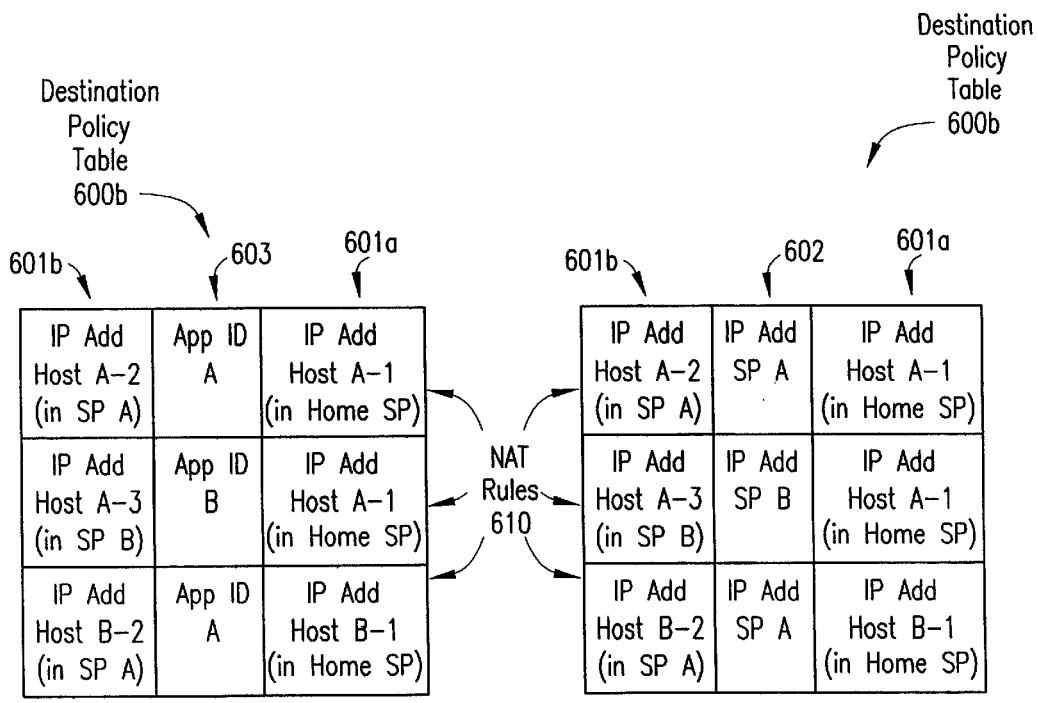
FIGS. 10A and 10B are exemplary policy tables for translating the destination address of a reply IP packet in accordance with embodiments of the present invention.

FIG. 9 illustrates the translation of an exemplary IP address 601b in the DA field 502 in reply IP packet 500b by router 115 to a new IP address 601a, according to the NAT rules downloaded to router 115 and stored in destination policy table 600b for transmission of the reply packet 500b including data (DATA-2) 604b to the remote machine. For illustrative purposes, the reply packet 500b received at router 115 is transmitted from the additional service provider back to the remote machine. Therefore, for clarity purposes, in FIG. 9, IP address 601b in IP packet 500b received at the router 115 is the translated IP address (IP Host A-2) for the remote machine in sent IP packet 500a, while IP address 601a in IP packet 500b sent from the router 115 is the original IP address (IP Host A-1) for the remote machine in sent IP packet 500a. Destination policy table 600b stores the various policies to be applied to reply IP packets 500b sent towards the remote machine from a server associated with an additional service provider running an application (APP ID-A) 603 defined in APP ID field 503. The policy is to translate the IP address 601b in the DA field to a new IP address 601a FIGS. 10A and 10B are exemplary destination policy tables 600b for translating the destination address of a reply IP packet, in accordance with embodiments of the present invention. Each destination policy table 600b includes one or more NAT rules 610 downloaded to the router. In FIG. 10A, each NAT rule 610 identifies a particular IP address 601b for the destination of the IP packet and application identifier 603 associated with the NAT rule 610. The router compares the IP address 601b within the DA field and application identifier 603 within the APP ID field of an IP packet to each NAT rule 610 stored within the destination policy table 600b to determine whether a particular NAT rule 610 should be applied to the reply IP packet. Both the IP address 601b for the destination remote machine and application identifier 603 can be used to compare with each NAT rule 610, or only the remote machine IP address 601b can be compared first, and from the matching NAT rules 610 with that IP address 601b, the application identifier 603 can be compared to determine the appropriate NAT rule 610 from the NAT rules 610 associated with the subscriber.

For example, as shown in FIG. 10A, one of the NAT rules 610 within the destination policy table 600b has a field indicating that the remote machine IP address 601b is the IP Address for "Host A" in service provider A, another rule 610 has a field indicating that the remote machine IP address 601b is the IP Address for "Host A" in service provider B, while another rule 610 has a field indicating that the remote machine IP address 601b is the IP Address for "Host B" in service provider A. Therefore, if the remote machine IP address 601b within the DA field of the IP packet is the IP Address for "Host A" in SP "A", the router can compare the application identifier 603 within the IP packet with the NAT rule 610 within the destination policy table 600b for IP Address for "Host A" in SP "A" to determine if the NAT rule matches. If so, the matching NAT rule 610 will be used to apply the policy defined by the matching NAT rule 610 on the reply IP packet. Thus, if both the IP address 601b within the DA field and application identifier 603 within the APP ID field of an IP packet header match one of the NAT rules 610 within the policy table 600b, the policy that the matching NAT rule 610 applies is to translate the remote machine IP address 601b within the DA field of the IP packet back into the original remote machine IP address 601a assigned to the home service provider for the remote machine (e.g., "Host A").

In FIG. 10B, instead of using the application identifier 603 as an indicator of the particular NAT rule 610 to apply, the destination policy table 600b can store the IP address 602 of the source of the IP packet, e.g., the IP address of the additional service provider (IP SP-A) in sent IP packet 500a, associated with the particular service provider that is providing the application. If both the remote machine IP address 601b and service provider IP address 602 match one of the NAT rules 610 within the destination policy table 600b, that matching NAT rule 610 is used to translate the remote machine IP address 601b back into the original remote machine IP address 601a assigned to the home service provider of the remote machine. The service provider IP address 602 may be beneficial in the situation where the subscriber has selected more than one service provider to provide the same application to enable proper routing of the IP packet. For example, the subscriber may require two separate e-mail accounts, one for business and one for personal use, and may use two separate service providers for each e-mail account. To enable the subscriber to receive IP packets relating to both e-mail accounts simultaneously, the source address of the IP packet (e.g., the IP address of the service provider) can be used to properly route IP packets from each of the two e-mail service providers.

Figure 11:
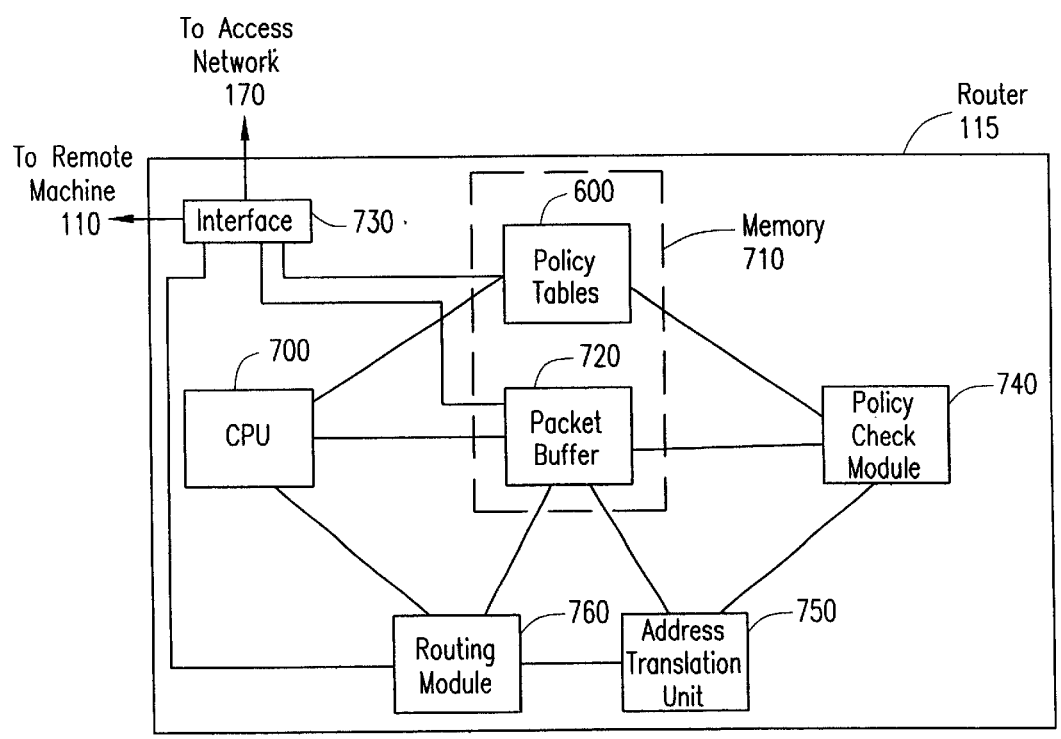
FIG. 11 is a block diagram illustrating exemplary functionality of a router for translating source and destination addresses of IP packets using policy tables, in accordance with embodiments of the present invention.

FIG. 11 is a block diagram illustrating a router 115 for translating source and destination addresses of IP packets using policy tables 600, in accordance with embodiments of the present invention. Router 115 includes an interface 730 for receiving downloaded subscriber profiles from the home service provider access network 170. The policies and NAT rules within the subscriber profile are stored in policy tables 600. Further, IP packets are received at the router 115 from both the remote machine 110 and the access network 170 via interface 730 and stored in buffer 720. Therefore, interface 730 includes both a physical interface and one or more logical interfaces for receiving the packet. However, it should be understood to one skilled in the art that the interface 730 can be implemented as multiple interfaces. Both the buffer 720 and policy tables 600 are stored in memory device 710 Memory device can include, for example, a random access memory (RAM). Buffer 720 and policy tables 600 can be physically implemented in separate memory devices or the same memory device.

Policy check module 740 reads the appropriate IP header fields from the IP packets stored in the buffer 720 and compares the IP header fields to policy tables 600 to determine if a matching NAT rule applies to the IP packet. If a matching NAT rule is found, policy check module 740 passes the NAT rule and IP packet to address translation unit 750 to perform the translation of the IP address (source or destination) using the matching NAT rule. Translated IP packets are routed to the next hop (next router or Internet host) via routing module 760. It should be noted that as used herein, the term "module" refers to the hardware, software and/or firmware required to perform the functions of the module. A central processing unit (CPU) 700 controls the downloading of NAT rules into the policy tables 600, buffering of IP packets received at the router, comparison of IP header information with the policy tables 600, translation of any addresses and routing of IP packets from the router. CPU 700 can be any microprocessor or microcontroller.

Figure 12:
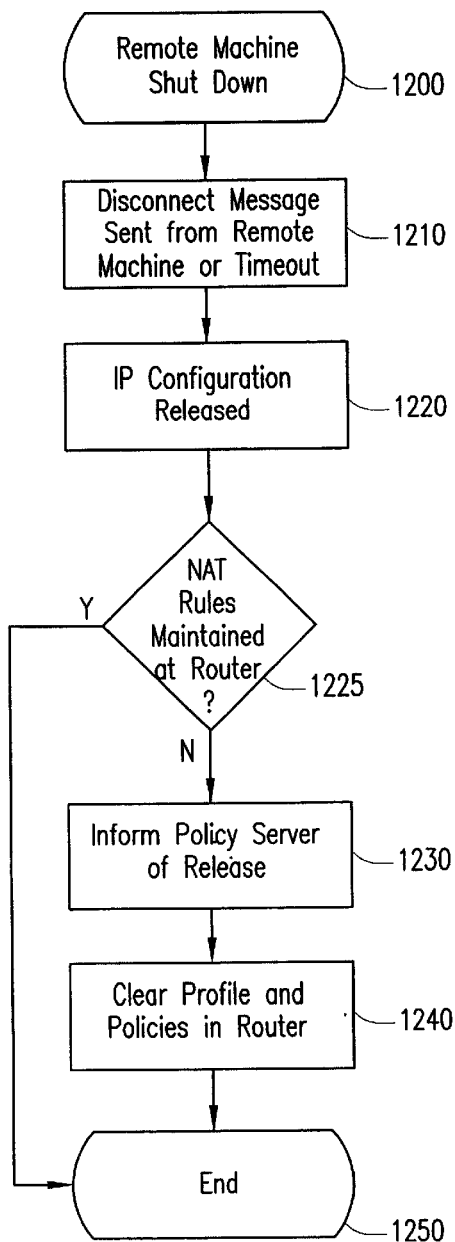
FIG. 12 is a flowchart illustrating exemplary steps for clearing policy tables from routers upon the termination of packet sessions.

FIG. 12 illustrating exemplary steps for clearing policy tables from routers upon the termination of packet sessions. When a remote machine disconnects from the Internet through a normal disconnect (step 1200), a disconnect message is sent from the remote machine to the DHCP server within the access network of the home service provider via the router (step 1210). Upon receiving the disconnect message (or if the disconnect is due to a sudden shut down, after a period of time), the DHCP server releases the IP configuration information (step 1220) as defined in IETF RFC 2131. If the NAT rules are dynamic rules downloaded at log-in or during a data session (step 1225), the DHCP server further sends a message to the policy server (step 1230) using LDAP or another similar protocol. The release message informs the policy server that the subscriber is no longer connected to the router.

Thereafter, the policy router sends a message to the router, using COPS, SNMP, XML or any other similar protocol, to clear the policies downloaded to the interface on the router to which the subscriber was connected (step 1240) and end the packet session (step 1250). In this way, memory space is conserved in the policy tables within the router for only those subscribers that have an active connection (i.e., are involved in a current packet session) with the access network of the home service provider. However, if the NAT rules are static, pre-configured rules maintained by the router, the packet session ends (step 1250) without clearing the policies from the router.

Figure 13:
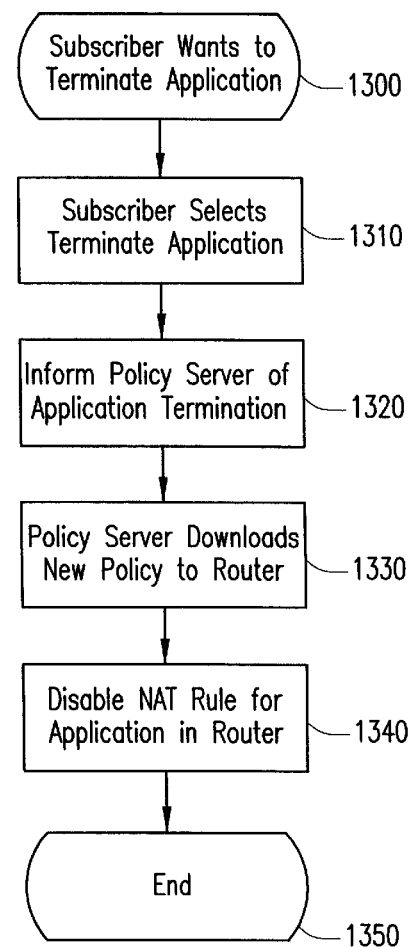
FIG. 13 is a flowchart illustrating exemplary steps for terminating an application during an active packet session.

FIG. 13 illustrating exemplary steps for terminating an application during an active packet session. When a subscriber decides to terminate an application provided by an additional service provider during an active packet session (step 1300), the subscriber can select a terminate option through an application interface provided to the subscriber (e.g., the subscriber can "click-on" an application exit icon on a web page hosted by web server) (step 1310). Upon receipt of the terminate instruction, the DHCP server can send a terminate application message including the application identifier of the particular application terminated to the policy server (step 1320) using LDAP or another similar protocol. The terminate message informs the policy server that the subscriber no longer desires to access the particular application identified by the application identifier during the current packet session. Thereafter, the policy router downloads a new policy to the router (step 1330), using COPS, SNMP, XML or any other similar protocol, to disable the NAT rule for the terminated application, while maintaining any other NAT rules for available applications (step 1340) to terminate the application for the subscriber (step 1350).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A router for enabling simultaneous connection to two or more service providers during a packet session between a host connected to said router and a home one of said two or more service providers associated with said router, comprising:

means for receiving a network address translation rule to be applied to packets transmitted to or from said host while said host is running a particular application during said packet session with said home service provider;

a memory for storing said network address translation rule;

means for receiving a packet associated with said particular application for transmission to or from said host; and means for translating an address of said packet between a first address identifying said host and associated with said home service provider and a second address identifying said host and associated with an additional one of said two or more service providers providing said particular application, using said network address translation rule.

2. The router of claim 1, further comprising:

a policy table within said memory for storing said network address translation rule.

3. The router of claim 2, wherein said policy table is a source policy table and said network address translation rule applies to packets transmitted from said host for said particular application provided by said additional service provider.

4. The router of claim 3, wherein said network address translation rule within said source policy table contains a first source address identifying said host and associated with said home service provider and a second source address identifying said host and associated with said additional service provider.

5. The router of claim 4, wherein said network address translation rule within said source policy table further contains an application identifier identifying said particular application, said network address translation rule being used to translate said first source address of said packet from said first source address to said second source address when said packet further includes said application identifier therein.

6. The router of claim 5, further comprising:
means for comparing said address of said packet with said first source address and an application identifier within said packet with said application identifier within said network address translation rule, and
means for applying said network address translation rule to said packet when said address of said packet matches said first source address and said application identifier within said packet matches said application identifier within said network address translation rule.

7. The router of claim 4, wherein said network address translation rule within said source policy table further contains a destination address identifying said additional service provider providing said particular application, said network address translation rule being used to translate said address of said packet from said first source address to said second source address when said packet further includes said destination address therein.

8. The router of claim 7, further comprising:
means for comparing said address of said packet with said first source address and a destination address within said packet with said destination address within said network address translation rule; and
means for applying said network address translation rule to said packet when said address of said packet matches said first source address and said destination address within said packet matches said destination address within said network address translation rule.

9. The router of claim 4, wherein said network address translation rule within said source policy table further contains routing information identifying a next-hop node within a packet network to receive said packet.

10. The router of claim 2, wherein said policy table is a destination policy table and said network address translation rule applies to packets transmitted to said host for said particular application from said additional service provider.

11. The router of claim 10, wherein said network address translation rule within said destination policy table contains a first destination address identifying said host and associated with said additional service provider and a second destination address identifying said host and associated with said home service provider.

12. The router of claim 10, wherein said network address translation rule within said destination policy table further contains an application identifier identifying said particular application, said network address translation rule being used to translate said address of said packet from said first destination address to said second destination address when said packet further includes said application identifier therein.

13. The router of claim 12, further comprising:
means for comparing said address of said packet with said first destination address and an application identifier within said packet with said application identifier within said network address translation rule; and
means for applying said network address translation rule to said packet when said address of said packet matches said first destination address and said application identifier within said packet matches said application identifier within said network address translation rule.

14. The router of claim 12, wherein said network address translation rule within said destination policy table further contains a source address identifying said additional service provider providing said particular application, said network address translation rule being used to translate said address of said packet from said first destination address to said second destination address when said packet further includes said source address therein.

15. The router of claim 14, further comprising:
means for comparing said address of said packet with said first destination address and a source address within said packet with said source address within said network address translation rule; and
means for applying said network address translation rule to said packet when said address of said packet matches said first destination address and said source address within said packet matches said source address within said network address translation rule.

16. The router of claim 1, further comprising:
means for disabling said network address translation rule upon termination of said particular application by said host.

17. The router of claim 1, wherein said router is located in an access network of said home service provider at the border between said host and said access network.

18. The router of claim 1, wherein said means for receiving said network address translation rule further comprises:
means for receiving a subscriber profile containing one or more policies associated with said host, said network address translation rule being included within said one or more policies.

19. The router of claim 1, wherein said memory is further configured to store a plurality of network address translation rules, said network address translation rule applied to said packet being one of said plurality of network address translation rules associated with said host and said particular application.

20. An access network of a home service provider for enabling a subscriber of said home service provider to connect to one or more additional service providers during a packet session with said home service provider in order to execute one or more applications provided by said one or more additional service providers, said access network comprising:
means for receiving an identity of a selected one of said one or more applications from said subscriber;
means for configuring a network address translation rule for said selected application to be applied to packets transmitted to or from a host of said subscriber while said host is running said selected application during said packet session with said home service provider; and
means for downloading said network address translation rule to a router connected between said host and said access network to enable said router to translate an address of each of said packets between a first address identifying said host and associated with said home service provider and a second address identifying said host and associated with a select one of said one or more additional service providers providing said select application.

21. The access network of claim 20, further comprising:
a policy server connected to receive said identity of said selected application, determine said network address translation rule for said selected application and download said network address translation rule to said router.

22. The access network of claim 21, further comprising:
a subscriber profile within said policy server for storing one or more policies associated with said subscriber, said network address translation rule being included within said one or more policies.

23. The access network of claim 22, further comprising:
a security server connected to authenticate said host to said access network, said subscriber profile being downloaded to said router from said policy server upon authentication of said host.

24. The access network of claim 23, further comprising:
a web server for providing a web page to said host requesting authentication information from said subscriber, said subscriber entering authentication information into said host for transmission to said security server to initiate said packet session with said home service provider.

25. The access network of claim 20, further comprising:
means for providing a list of said one or more applications to said subscriber for said subscriber to select from.

26. The access network of claim 25, wherein said means for providing comprises:
a web server for providing a web page to said host of said subscriber, said web page including said list, said identity of said select application being transmitted from said host to said web server upon selection of said select application by said subscriber at said host.

27. An access network of a first service provider for allowing a subscriber of a second service provider to access an application provided by said first service provider during a packet session with said second service provider, comprising:
means for allocating a portion of a pool of addresses assigned to said first service provider to said second service provider; and
means for receiving a sent packet associated with said application from a host of said subscriber during said packet session between said host and said second service provider, said packet having a source address from said portion of said pool of addresses allocated to said second service provider, said source address having been translated from an original address identifying said host and associated with said second service provider using a network address translation rule applied to each packet transmitted to or from said host while said host is running said application.

28. The access network of claim 27, further comprising:
means for transmitting a reply packet associated with said application to said host, said reply packet having a destination address, said destination address being said source address of said sent packet, said destination address being translated to said original address for transmission to said host.

29. The access network of claim 27, wherein said means for transmitting comprises:
a router associated with said first service provider and connected to said host via a packet network, said router being capable of recognizing said destination address as belonging to said second service provider and forwarding said reply packet to an access network of said second service provider, using said destination address.

30. A system for enabling a subscriber to simultaneously connect to two or more service providers to execute two or more applications, comprising:
a first access network associated with a first one of said two or more service providers and connected to a host of said subscriber for a packet session, said first access network being configured to determine a network address translation rule to be applied to packets transmitted to or from said host while said host is running a particular application during said packet session with said first service provider;
a second access network associated with a second one of said two or more service providers for providing said particular application; and
a router connected between said host and said first access network for receiving said network address translation rule from said first access network, receiving a packet associated with said particular application transmitted to or from said host and translating an address of said packet between a first address identifying said host and associated with said first service provider and a second address identifying said host and associated with said second service provider, using said network address translation rule.

31. The system of claim 30, wherein said network address translation rule contains a first source address identifying said host and associated with said first service provider, a second source address identifying said host and associated with said second service provider and an application identifier identifying said particular application, said network address translation rule being used to translate said address of said packet from said first source address to said second source address when said packet further includes said application identifier therein.

32. The system of claim 30, wherein said network address translation rule contains a first source address identifying said host and associated with said first service provider, a second source address identifying said host and associated with said second service provider and a destination address identifying said second service provider providing said particular application, said network address translation rule being used to translate said address of said packet from said first source address to said second source address when said packet further includes said destination address therein.

33. The system of claim 30, wherein said network address translation rule further identifies routing information for a next-hop node within a packet network to receive said packet.

34. The system of claim 30, wherein said network address translation rule within said destination policy table contains a first destination address identifying said host and associated with said second service provider, a second destination address identifying said host and associated with said first service provider and an application identifier identifying said particular application, said network address translation rule being used to translate said address of said packet from said first destination address to said second destination address when said packet further includes said application identifier therein.

35. The system of claim 30, wherein said network address translation rule contains a first destination address identifying said host and associated with said second service provider, a second destination address identifying said host and associated with said first service provider and a source address identifying said additional service provider providing said particular application, said network address translation rule being used to translate said address of said packet from said first destination address to said second destination address when said packet further includes said source address therein.

36. The system of claim 30, wherein said router is further configured to disable said network address translation rule upon termination of said particular application by said host.

37. The system of claim 30, wherein said first access network is further configured to download a subscriber profile containing one or more policies associated with said host to said router, said network address translation rule being included within said one or more policies.

38. The system of claim 30, wherein said first access network is further configured to download a plurality of network address translation rules to said router, said network address translation rule applied to said packet being one of said plurality of network address translation rules associated with said host and said particular application.

39. The system of claim 30, wherein said first access network is further configured to receive an identity of said particular application from said subscriber and, in response, determine said network address translation rule for said particular application.

40. The system of claim 39, wherein said first access network further comprises:

a policy server connected to receive said identity of said particular application, determine said network address translation rule for said selected application and download said network address translation rule to said router.

41. The system of claim 40, wherein said first access network further comprises:

a security server connected to authenticate said host to said first access network, said network address translation rule being downloaded to said router from said policy server upon authentication of said host.

42. The system of claim 41, wherein said first access network further comprises:

a web server for providing a web page to said host requesting authentication information from said subscriber, said subscriber entering authentication information into said host for transmission to said security server to initiate said packet session with said first service provider.

43. The system of claim 30, wherein a pool of addresses is assigned to said second service provider, said second access network being further configured to allocate a portion of said pool of addresses to said first service provider.

44. The system of claim 43, wherein said packet is a sent packet from said host to said second access network, said second address being a source address from said portion of said pool of addresses allocated to said second service provider.

45. The system of claim 44, wherein said packet is a reply packet to said host, said first address being a destination address, said destination address being said source address of said sent packet.

46. The system of claim 45, further comprising:

an additional router connected with said second access network, said additional router being capable of recognizing said destination address as belonging to said first service provider and forwarding said reply packet to said first access network of said first service provider, using said destination address.

47. A method for a router to enable simultaneous connection to two or more service providers during a packet session between a host connected to said router and a home one of said two or more service providers associated with said router, comprising the steps of:

receiving a network address translation rule to be applied to packets transmitted to or from said host while said host is running a particular application during said packet session with said home service provider;

receiving a packet associated with said particular application for transmission to or from said host;

translating an address of said packet between a first address identifying said host and associated with said home service provider and a second address identifying said host and associated with an additional one of said two or more service providers providing said particular application, using said network address translation rule; and forwarding said packet to said additional service provider, using said second address.

48. The method of claim 47, further comprising the step of:

storing said network address translation rule within a source policy table in said router, said network address translation rule containing a first source address identifying said host and associated with said home service provider, a second source address identifying said host and associated with said additional service provider and an application identifier identifying said particular application, said step of translating said address of said packet from said first source address to said second source address being performed when said packet further includes said application identifier therein.

49. The method of claim 48, wherein said step of translating further comprises the steps of:

comparing said address of said packet with said first source address and an application identifier within said packet with said application identifier within said network address translation rule; and applying said network address translation rule to said packet when said address of said packet matches said first source address and said application identifier within said packet matches said application identifier within said network address translation rule.

50. The method of claim 49, wherein said step of forwarding further comprises the step of:

forwarding said packet using routing information within said network address translation rule in source policy table identifying a next-hop node within a packet network to receive said packet.

51. The method of claim 47, further comprising the step of:

storing said network address translation rule within a destination policy table in said router, said destination policy table containing a first destination address identifying said host and associated with said additional service provider, a second destination address identifying said host and associated with said home service provider and an application identifier identifying said particular application, said step of translating said address of said packet from said first destination address to said second destination address being performed when said packet further includes said application identifier therein.

52. The method of claim 51, wherein said step of translating further comprises the steps of:

comparing said address of said packet with said first destination address and an application identifier within said packet with said application identifier within said network address translation rule; and applying said network address translation rule to said packet when said address of said packet matches said first destination address and said application identifier within said packet matches said application identifier within said network address translation rule.

53. The method of claim 47, wherein said step of receiving said network address translation rule further comprises the step of:

receiving a subscriber profile containing one or more policies associated with said host, said network address translation rule being included within said one or more policies.

54. A method for dynamically enabling a subscriber of a home service provider to connect to one or more additional service providers during a packet session with said home service provider in order to execute one or more applications provided by said one or more additional service providers, said method comprising the steps of:

receiving an identity of a selected one of said one or more applications from said subscriber during said packet session;

configuring a network address translation rule for said selected application to be applied to packets transmitted to or from a host of said subscriber while said host is running said selected application during said packet session with said home service provider; and downloading said network address translation rule to a router connected between said host and said access network to enable said router to translate an address of each of said packets between a first address identifying said host and associated with said home service provider and a second address identifying said host and associated with a select one of said one or more additional service providers providing said select application during said packet session.

55. The method of claim 54, wherein said step of receiving further comprises the step of:

providing a list of said one or more applications to said subscriber for said subscriber to select from via a web page during said packet session.

56. A method for enabling a subscriber of a home service provider to connect to one or more additional service providers during a packet session with said home service provider in order to execute one or more applications provided by said one or more additional service providers, said method comprising the steps of:

receiving an identity of a selected one of said one or more applications from said subscriber;

configuring a network address translation rule for said selected application to be applied to packets transmitted to or from a host of said subscriber while said host is running said selected application during said packet session with said home service provider;

storing said network address translation rule within a subscriber profile associated with said subscriber;

initiating said packet session with said host; and downloading said subscriber profile to a router connected between said host and said access network to enable said router to translate an address of each of said packets between a first address identifying said host and associated with said home service provider and a second address identifying said host and associated with a select one of said one or more additional service providers providing said select application during said packet session.

57. The method of claim 56, wherein said step of storing further comprises the step of:

storing one or more policies associated with said subscriber within said subscriber profile, said network address translation rule being included within said one or more policies.

58. The method of claim 56, further comprising the step of:

authenticating said host to said access network, said subscriber profile being downloaded to said router upon authentication of said host.

59. A method for enabling a subscriber to simultaneously connect to two or more service providers to execute two or more applications, comprising the steps of:

establishing a packet session between a host of said subscriber and a first access network associated with a first one of said two or more service providers;

downloading a network address translation rule to be applied to packets transmitted to or from said host while said host is running a particular application during said packet session with said first service provider to a router connected between said host and said first access network;

receiving a packet associated with said particular application transmitted to or from said host at said router; and translating an address of said packet between a first address identifying said host and associated with said first service provider and a second address identifying said host and associated with a second one of said two or more service providers providing said particular application, using said network address translation rule.

60. The method of claim 59, further comprising the step of:

forwarding said packet using routing information identifying a next-hop node within said network address translation rule.

61. The method of claim 59, wherein said step of downloading further comprises the step of:

downloading a plurality of network address translation rules to said router, said network address translation rule applied to said packet being one of said plurality of network address translation rules associated with said host and said particular application.

62. The method of claim 59, further comprising the step of:

allocating a portion of a pool of addresses assigned to said second service provider to said first service provider.

63. The method of claim 62, wherein said packet is a sent packet from said host to said second access network, said second address being a source address from said portion of said pool of addresses allocated to said second service provider.

64. The method of claim 62, wherein said packet is a reply packet to said host, said first address being a destination address, said destination address being said source address of said sent packet.

65. The method of claim 64, further comprising the step of:

forwarding said reply packet from an additional router connected with said second access network to said first access network of said first service provider using said destination address.

* * * * *